(12) United States Patent
Baker et al.

(10) Patent No.: US 7,782,606 B2
(45) Date of Patent: Aug. 24, 2010

(54) HARD DISK DRIVE CARRIER LATCH APPARATUS

(75) Inventors: Bruce Edwin Baker, Round Rock, TX (US); Martin Joseph Crippen, Apex, NC (US); Brian Michael Kerrigan, Cary, NC (US); Brian Alan Trumbo, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 12/119,292

(22) Filed: May 12, 2008

(65) Prior Publication Data

US 2009/0279248 A1 Nov. 12, 2009

(51) Int. Cl.
G06F 1/16 (2006.01)
H05K 7/16 (2006.01)
A47B 81/00 (2006.01)

(52) U.S. Cl. .................. 361/679.39; 361/679.33; 361/679.58; 361/726; 361/727; 312/223.1

(58) Field of Classification Search ..................... 361/679.01–679.45, 724–727, 679.55–679.59; 312/223.1, 223.2; 360/97.01, 98.01
See application file for complete search history.

(56) References Cited

U.S. PATENT DOCUMENTS

| | | | |
|---|---|---|---|
| 4,982,303 A * | 1/1991 | Krenz | ............... 360/137 |
| 6,247,944 B1 | 6/2001 | Bolognia et al. | |
| 6,325,353 B1 | 12/2001 | Jiang | |
| 6,515,855 B1 | 2/2003 | Yen-Kuang | |
| 6,556,432 B2 * | 4/2003 | Chen et al. | ............ 361/679.33 |
| 6,560,098 B1 * | 5/2003 | Beinor et al. | .......... 361/679.39 |
| 6,606,256 B1 | 8/2003 | Lee et al. | |
| 6,637,719 B2 | 10/2003 | Jiang | |
| 6,854,174 B2 | 2/2005 | Jiang | |
| 6,879,495 B2 | 4/2005 | Jiang | |
| 7,012,803 B1 | 3/2006 | Austin et al. | |
| 7,139,166 B2 | 11/2006 | Marcade et al. | |
| 7,251,132 B1 | 7/2007 | Paul et al. | |
| 7,280,352 B2 | 10/2007 | Wilson et al. | |
| 2006/0087762 A1 | 4/2006 | Ohishi | |
| 2007/0127202 A1 * | 6/2007 | Scicluna et al. | ............. 361/685 |

* cited by examiner

Primary Examiner—Jayprakash N Gandhi
Assistant Examiner—Nidhi Desai
(74) Attorney, Agent, or Firm—Cynthia G. Seal; Jeffrey L. Streets

(57) ABSTRACT

A hard disk drive carrier having a latch apparatus to facilitate leveraged insertion of a hard disk drive into a receiving drive bay to an interfaced position, securing of the hard disk drive carrier in the drive bay when the hard disk drive secured to the carrier interfaces with a host computer, leveraged dislodgement of the hard disk drive from its interfaced position for removal of the hard disk drive from the drive bay, and proper positioning of the latch apparatus upon insertion of the hard disk drive carrier to ensure proper engagement of the latch apparatus with the drive bay for leveraged insertion and removal.

16 Claims, 7 Drawing Sheets

HARD DISK DRIVE CARRIER LATCH APPARATUS

BACKGROUND OF THE INVENTION

1. Field of the Invention

The present invention is related to a carrier for positioning a disk drive in a drive bay to interface the disk drive with a host computer, and more specifically, to a latch apparatus for securing a carrier in, or removing a carrier from, a drive bay.

2. Background of the Related Art

Hard disk drives generally include a data storage disk secured within a housing that may be coupled to a carrier, sometimes referred to as a tray, which is adapted to be received and secured in a drive bay to interface with a host computer. For example, a generally circular data storage disk is rotatably coupled within the housing in a position to rotate relative to the housing and about a generally vertical axis. A disk reader head is also movably coupled within the housing to controllably track across the rotatable data storage disk to retrieve data stored on the disk, or to retrievably write data to the disk.

A plurality of hard disk drives may be arranged within an array of bays within a chassis. This configuration enables a host computer to interface with numerous hard disk drives, each of which is replaceable independently of the others. Each drive bay may include a receiving port for electronically docking the hard disk drive secured within that bay. For example, a hard disk drive interface plug may be disposed at a leading end of each hard disk drive, and the interface plug may plug into a mating plug positioned within the host system and at the end of the bay to electronically couple the hard disk drive to the host computer.

Data storage density may be improved using compact hard disk drive carriers that can be efficiently installed within the bays of the host system along side other hard disk drive carriers. The host computer may be designed to continue to operate and to communicate with a plurality of hard disk drives as an individual hard disk drive carrier is removed or "hot swapped" from a drive bay or as a replacement hard disk drive carrier is installed within the vacant bay to interface with the host computer.

A hard disk drive carrier may be secured to a hard disk drive housing and inserted into a drive bay, for example, with an interface plug at the leading end of the hard disk drive being inserted into the mouth of the bay first. The hard disk drive carrier may then be displaced into the bay to an interfaced position where the interface plug of the hard disk drive is docked with a mating plug of the host system. The hard disk drive carrier should secure the hard disk drive in the interfaced position using a latch apparatus to prevent the hard disk drive carrier from being inadvertently displaced from the interfaced position during use of the hard disk drive. The motor that rotates the hard disk or the actuator that positions the head to read from the hard disk or write to the hard disk typically cause vibrations that can result in the hard disk drive becoming dislodged from the interfaced position or disconnected from the host system in the absence of the latch apparatus.

BRIEF SUMMARY OF THE INVENTION

One embodiment of the present invention provides a latch apparatus for use with a computer hard disk drive carrier that is adapted to be removably installed within a drive bay to interface a hard disk drive secured to the carrier with a host computer. In one embodiment, the hard disk drive carrier comprises a hard disk drive and a plug-in interface for electronically coupling the hard disk with the host computer, a handle pivotally coupled to the hard disk drive carrier and pivotable between a secured position, for securing the hard disk drive carrier within a drive bay, and an open position, for releasing the hard disk drive carrier for removal from the drive bay.

In one embodiment, the latch apparatus comprises a handle that is coupled to, and cooperates with, a follower. The handle may comprise a first end to be grasped by the user, a second end opposite the first end, and a pivotal coupling there between for coupling the handle to the case. The follower of the latch apparatus may be manipulated by the user using the first end of the handle to provide: 1) leveraged insertion of the hard disk drive carrier to an interfaced position in the drive bay; 2) securing of the hard disk drive carrier within the drive bay; 3) leveraged disconnection of the hard disk drive carrier from the interfaced position; and 4) positioning of the hard disk drive carrier and the latch apparatus within the drive bay for leveraged insertion of the hard disk drive carrier. These advantages of the latch apparatus will be discussed and demonstrated in connection with the embodiments described below.

In one embodiment, the latch apparatus may be used to dock the hard disk drive carrier into the drive bay to interface with the host computer. The follower of the latch apparatus is coupled to and cooperates with the pivoting handle during installation of the hard disk drive carrier. The follower may have a first end and a second end, and the handle may be pivoted by the user from an open position to an engaged position to engage a latch key at the first end of the follower with a slot in the drive bay. The handle may then be pivoted from the engaged position to a secured position to provide leveraged displacement of the hard disk drive carrier into the bay to the docked position. In one embodiment, the handle may be locked in the secured position using a locking pawl to prevent inadvertent removal of the hard disk drive carrier from the docked position. In another embodiment, the latch apparatus may be used to disconnect the hard disk drive carrier from its docked position within the drive bay to disengage the host computer.

BRIEF DESCRIPTION OF THE APPENDED DRAWINGS

DETAILED DESCRIPTION OF THE INVENTION

Figure 1:
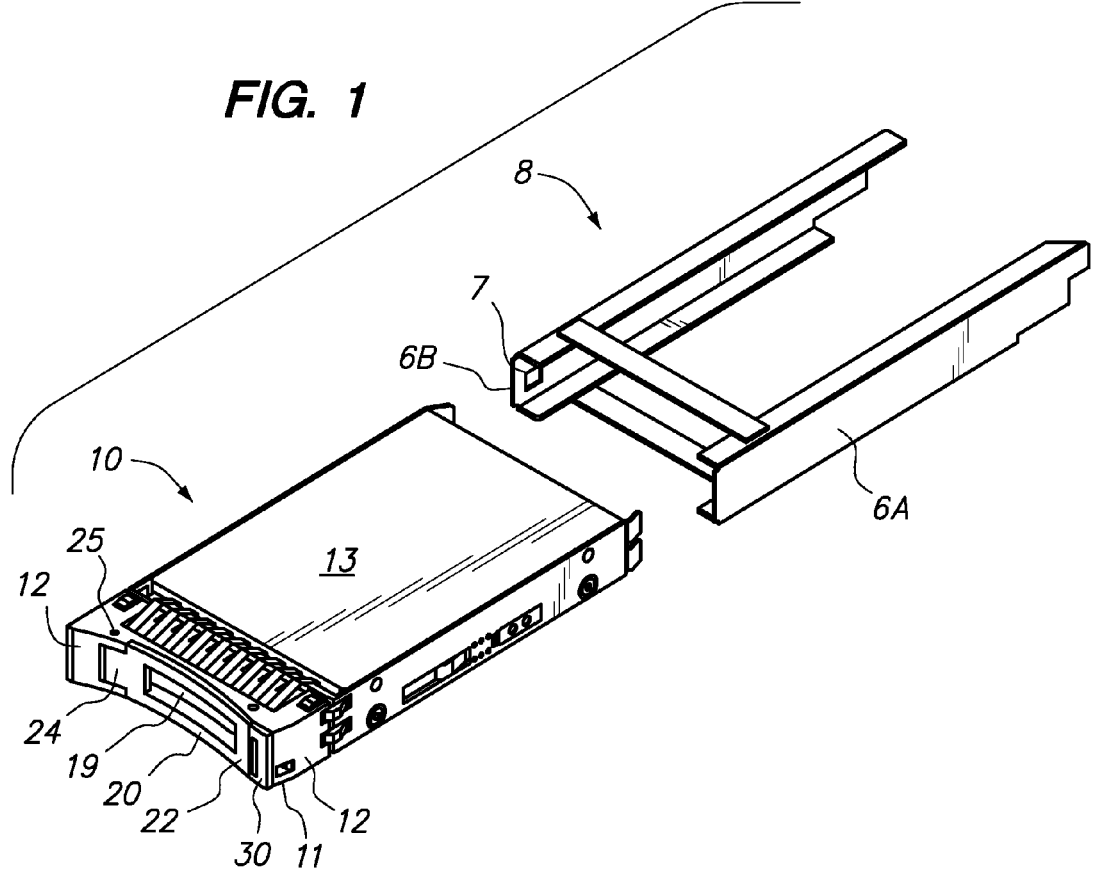
FIG. 1 is a perspective view of a HDD carrier coupled to one embodiment of the latch apparatus of the present invention and aligned for installation within a HDD cage that forms a receiving bay of a chassis.

In one embodiment described below in connection with the appended drawings, the present invention provides a latch apparatus for use in a computer hard disk drive carrier that secures a hard disk drive, wherein the carrier is adapted to be removably installed within a drive bay to interface a hard disk drive with a host computer. The hard disk drive carrier comprises a handle that is pivotable between a closed position, for securing the hard disk drive carrier within a drive bay, and an open position, for releasing the hard disk drive carrier for removal from the drive bay.

In another embodiment, the latch apparatus comprises a handle that is coupled to, and cooperates with, a follower. The handle may comprise a first end to be grasped by the user, a second end opposite the first end, and a pivotal connection there between. The follower of the latch apparatus may be manipulated by the user using the first end of the handle to provide: (1) positioning of the hard disk drive carrier and the latch apparatus to an initial position within the drive bay in preparation for leveraged insertion of the hard disk drive carrier; (2) leveraged insertion of the hard disk drive carrier to an interfaced position in the drive bay; (3) securing of the hard disk drive carrier within the drive bay; and (4) leveraged disconnection of the hard disk drive carrier from the interfaced position.

In yet another embodiment, the latch apparatus may be used to dock the hard disk drive carrier into the drive bay to interface with the host computer. The follower of the latch apparatus is coupled to and cooperates with the pivoting handle during installation of the hard disk drive carrier. The handle may be pivoted by the user from an open position to an intermediate position to engage a latch key at the first end of the follower with a slot in the drive bay, which may be a slot in a HDD cage. The handle may then be pivoted from the intermediate position to a secured position to provide leveraged displacement of the hard disk drive carrier into the bay to the docked position. Optionally, the handle may be locked in the secured position using a locking pawl to prevent inadvertent dislodging of the hard disk drive carrier from the docked position. As the handle is initially pivoted from the open position towards the engaged position, the latch key, disposed at a first end of the follower, may be inserted into a slot in the drive bay. With continued pivoting of the handle from the engaged position towards the secured position, the latch key is displaced within the slot to, and then against, a proximal end of the slot. Since the latch key cannot move any further in the proximal direction, continued pivoting of the handle to the secured position imparts a docking force through the latch apparatus and to the hard disk drive carrier to distally displace the hard disk drive carrier and hard disk drive until the hard disk drive docks with the host computer.

In a further embodiment, the latch apparatus may be used to dislodge the hard disk drive from its docked position within the drive bay to disengage the host computer. Accordingly, the follower is coupled to and cooperates with the handle as the handle is pivoted by the user from the secured position to an intermediate position to engage a latch key of the follower with a distal end of the slot in the drive bay. Since the latch key cannot move any further in the distal direction, continued pivoting of the handle from the intermediate position towards the open position imparts a dislodging force through the latch apparatus to the hard disk drive carrier to dislodge the hard disk drive carrier from its docked position within the drive bay. Still further pivoting of the handle to a fully open position retracts the latch key from the slot so that the hard disk drive carrier can be removed from the drive bay.

In a still further embodiment, the latch key at the first end of the follower may be strategically positioned for being inserted into the slot in the drive bay by inserting the hard disk drive carrier to a staging position that is intermediate the removed position and the docked position within the drive bay. The hard disk drive carrier may be conveniently positioned at the staging position within the drive bay when the lever handle is in a fully open position to deploy a stop key, which may be disposed at a second end of the follower, to protrude from the side of the hard disk drive carrier to limit the extent to which the hard disk drive carrier may be inserted into the drive bay. Deployment of the stop key prevents insertion of the hard disk drive carrier beyond the precise position at which the latch key may be inserted into the slot in the drive bay, in the manner previously described.

As the latch key is disposed into the slot in the drive bay, it is preferably for the stop key to be simultaneously retracted to permit leveraged installation of the hard disk drive carrier to the docked position within the drive bay. As the handle is pivoted from the intermediate position towards the secured position, the latch key may be repositioned within the slot in the drive bay to engage, and then bear against, the proximal end of the slot to controllably displace the hard disk drive carrier into the drive bay to its docked position.

The hard disk drive carrier of the present invention further includes a case to which both the handle and the follower are movably coupled. The case is preferably coupled to a pair of rails that are in turn secured to a hard disk drive. The handle of the latch apparatus may be pivotally secured to the case of the latch apparatus. Preferably, the pivotal coupling of the handle to the case is intermediate the first end and the second end of the handle, and the pivotal coupling is disposed substantially closer to the second end of the handle to provide substantial leverage to the user upon manipulation of the first end. The coupling between the handle and the follower, or between the case and the follower, may comprise a follower spring to bias the follower towards a first side of the latch apparatus. For example, the follower spring may bias the follower towards a position in which the key at the first end of the follower is disposed within the slot of the drive bay. The coupling between the handle and the follower may comprise a handle pin located at or adjacent to the second end of the handle. The handle pin may be movably received within a follower actuation slot located intermediate the first end and the second end of the follower, preferably close to the latch key at the first end.

The handle pin may interact with the follower actuation slot to provide two distinct phases of movement of the follower. For example, in a first phase, the follower may be generally rotated within the case by movement of the handle from the secured position to the intermediate position, or vice-versa. Alternately, in a second phase, the follower may be generally translated within the case by movement of the handle from the intermediate position to the open position, or vice-versa. It should be understood that the terms "first phase" and "second phase" should not be interpreted as meaning that other movement of the follower may not be produced between the two, and these terms should not be interpreted as dictating a sequence in which these phases may occur.

The follower of the latch apparatus may be movably secured within the case by the coupling between the follower and the handle, which is pivotally secured to the case, and also by a coupling between the follower and the case. In one embodiment, the case comprises a case pin protruding from the case of the latch apparatus and movably received within a follower guide slot intermediate the first end and the second end of the follower, preferably adjacent to the second end of the follower. The follower guide slot receives the case pin to permit both translation and rotation of the follower relative to the case. Additionally, the follower actuation slot receives the handle pin adjacent to the first end of the handle.

It should be appreciated that various embodiments of the invention provide a latch apparatus that facilitates leveraged insertion of the hard disk drive carrier to the interfaced position within the bay without consuming an excessive amount of lateral space beyond the width of the hard disk drive, and may thereby enable an increase the density of hard disk drives that may be disposed within a given host computer system. Embodiments of the latch apparatus may also facilitate leveraged insertion and precise positioning of the hard disk drive carrier in the interfaced position, as well as leveraged dislodgement and removal of the hard disk drive carrier from the interfaced position.

FIG. 1 is a perspective view of a hard disk drive carrier 10, including one embodiment of the latch apparatus 11 of the present invention, securing a hard disk drive 13 in alignment for installation within a drive bay 8, shown here consisting of a hard disk drive cage. The hard disk drive carrier 10 includes a case 12 and a latch apparatus 11. The latch apparatus 11 includes a handle 20 having a first end 22 and a second end 27 (See FIG. 2), and further comprising a pivot pin 25 for pivotally securing the handle 20 to the case 12. The handle 20 may comprise an aperture 19 or a plurality of apertures to facilitate the flow of cooling air when the handle is in its secured position. The handle 20 is shown locked in its secured position using a locking pawl 30 that may be spring-biased towards its locked position.

The drive bay 8 may be comprised of two generally parallel channels 6A, 6B coupled one to the other, to receive the hard disk drive carrier 10. On of the channels 6B comprises a slot 7 for receiving and cooperating with the latch apparatus, as described below.

Figure 2:
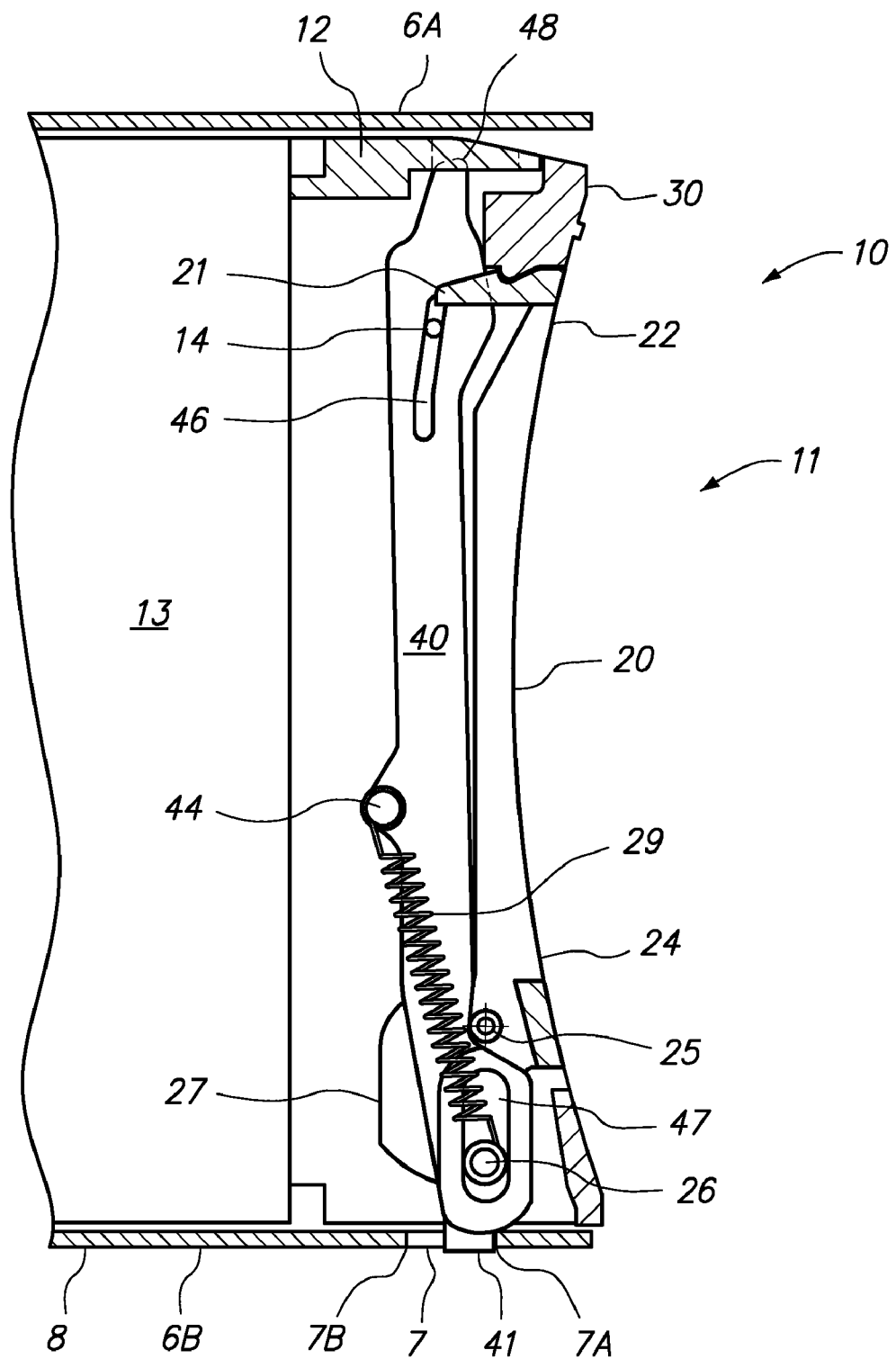
FIG. 2 is a cross-sectional plan view of the embodiment of the latch apparatus of the HDD carrier of FIG. 1 in its secured position, and the handle of the latch apparatus in its secured and locked position.

FIG. 2 is a cross-sectional plan view showing the latch apparatus 11 of the hard disk drive carrier 10 in its secured position within the drive bay 8 that comprises channels 6A, 6B, and the handle 20 of the latch apparatus 11 in its secured and locked position. The handle 20 comprises a first end 22 having a pawl receiver 21 for cooperating with the locking pawl 30 to lock the handle 20 in the secured position. The follower 40 of the latch apparatus is shown in the corresponding secured position with a latch key 41 disposed against the proximal end 7A of a slot 7 in the channel 6B.

The handle 20 further comprises a second end 27 having a protruding handle pin 26 received by the follower 40 within a first follower actuation slot 47 adjacent to the latch key 41, and a pivotal coupling 25 intermediate the first end 22 and the second end 27. It should be noted that the pivotal coupling 25 is positioned substantially closer to the second end 27 of the handle 20 as compared to the first end 22, and that this position provides for a substantial amount of leverage that can be generated by manipulating the first end 22 of the handle 20 and applied to the handle pin 26 and to the follower 40 through the follower actuation slot 47. The follower 40 further comprises a follower guide slot 46 slidably receiving a case pin 14 secured to the case 12. It should be understood that the shape of the follower actuation slot 47 and the follower guide slot 46, and the position of the handle pivot 25, case pin 14, follower actuation slot 47 and follower guide slot 46 may be varied to modify the movement of the follower 40 that results from pivoting of the handle 20, and that the shapes and dimensions illustrated in the appended figures should not be deemed limiting of the shapes and positions of any of the elements of the components. The appended drawings are provided to illustrate one embodiment of the present invention, and the invention is limited only by the claims.

Also shown in FIG. 2 is a follower spring 29 coupled between a spring post 44 and the handle pin 26 to bias the follower 40 in a direction towards the slot 7 in which the latch key 41 of the follower is received. It should be understood that the follower spring 29 will, in the configuration shown in FIG. 2, also urge the handle 20 to the open position (see FIG. 6) when the locking pawl 30 is disengaged from the pawl receiver 21.

Figure 3:
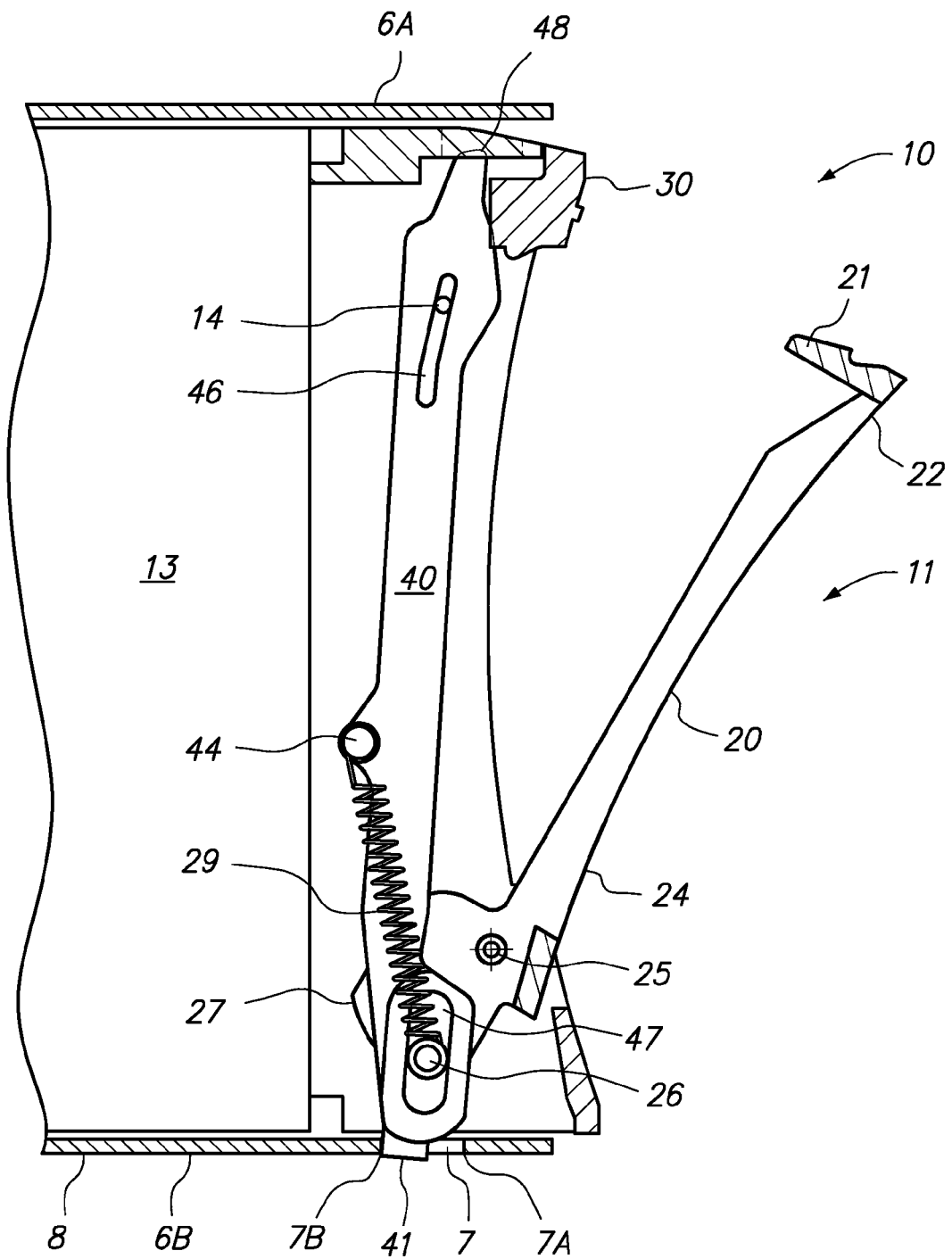
FIG. 3 is the cross-sectional plan view of FIG. 2 after the handle is unlocked and pivoted towards an open position to cam the latch key at the first end of the follower to engage a distal end of the slot.

FIG. 3 is the cross-sectional plan view of FIG. 2 after the handle 20 is unlocked from the locking pawl 30 and pivoted approximately 30 degrees in a clockwise (from plan view) direction to an intermediate position. The corresponding movement of the handle pin 26 cams against the follower actuation slot 47 of the follower 40 to displace the latch key 41 of the follower 40 away from the proximal end 7A of the slot 7 and towards the distal end 7B of the slot 7 to engage the distal end 7B. It should be understood that, upon application of a force by the latch key 41 against the distal end 7B of the slot 7, an equal and opposite reaction force is transferred through the latch apparatus 11 to the hard disk drive carrier 10 to dislodge the hard disk drive carrier 10 from its docked position within the drive bay 8 and terminate communication between the hard disk drive 13 and the host computer (not shown). It should be noted that position of the follower 40 in FIG. 3 is primarily rotated by lateral displacement of the latch key 41 and by rotation about the case pin 14 received through the follower guide slot 46, and that there is little translation of the follower 40 as compared to the position in FIG. 2.

Figure 4:
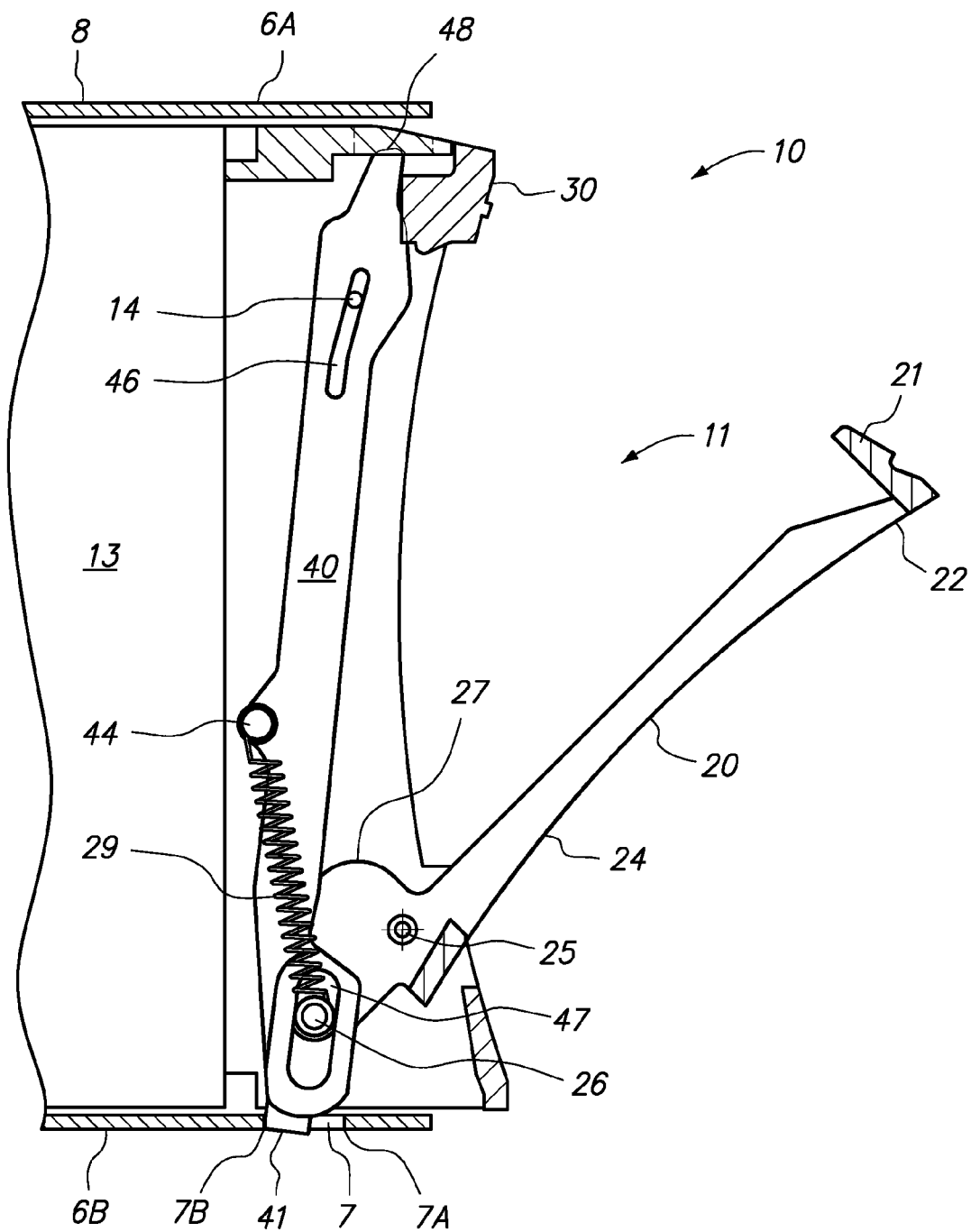
FIG. 4 is the cross-sectional plan view of FIG. 3 after the handle is pivoted further towards an open position to cam the latch key against the distal end of the slot and to disconnect the HDD carrier from its interfaced position within the HDD cage.

FIG. 4 is the cross-sectional plan view of FIG. 3 after the handle 20 is pivoted further towards an open position to further cam the latch key 41 of the follower 40 against the distal end 7B of the slot 7 and to further dislodge the hard disk drive carrier 10 from its docked position within the drive bay 8. It should be noted that the position of the follower 40 relative to the hard disk drive carrier 10 has changed very little as compared to its position in FIG. 3, and that the angle of the handle 20 resulted in a substantial movement of the handle pin 26 within the follower actuation slot 47 as compared to its previous position shown in FIG. 3. Continued rotation of the handle 20 from the position shown in FIG. 3 has further cammed the follower actuation slot 47 and dislodged the hard disk drive carrier 10 further from the docked position (see FIG. 2) within the drive bay 8.

Figure 5:
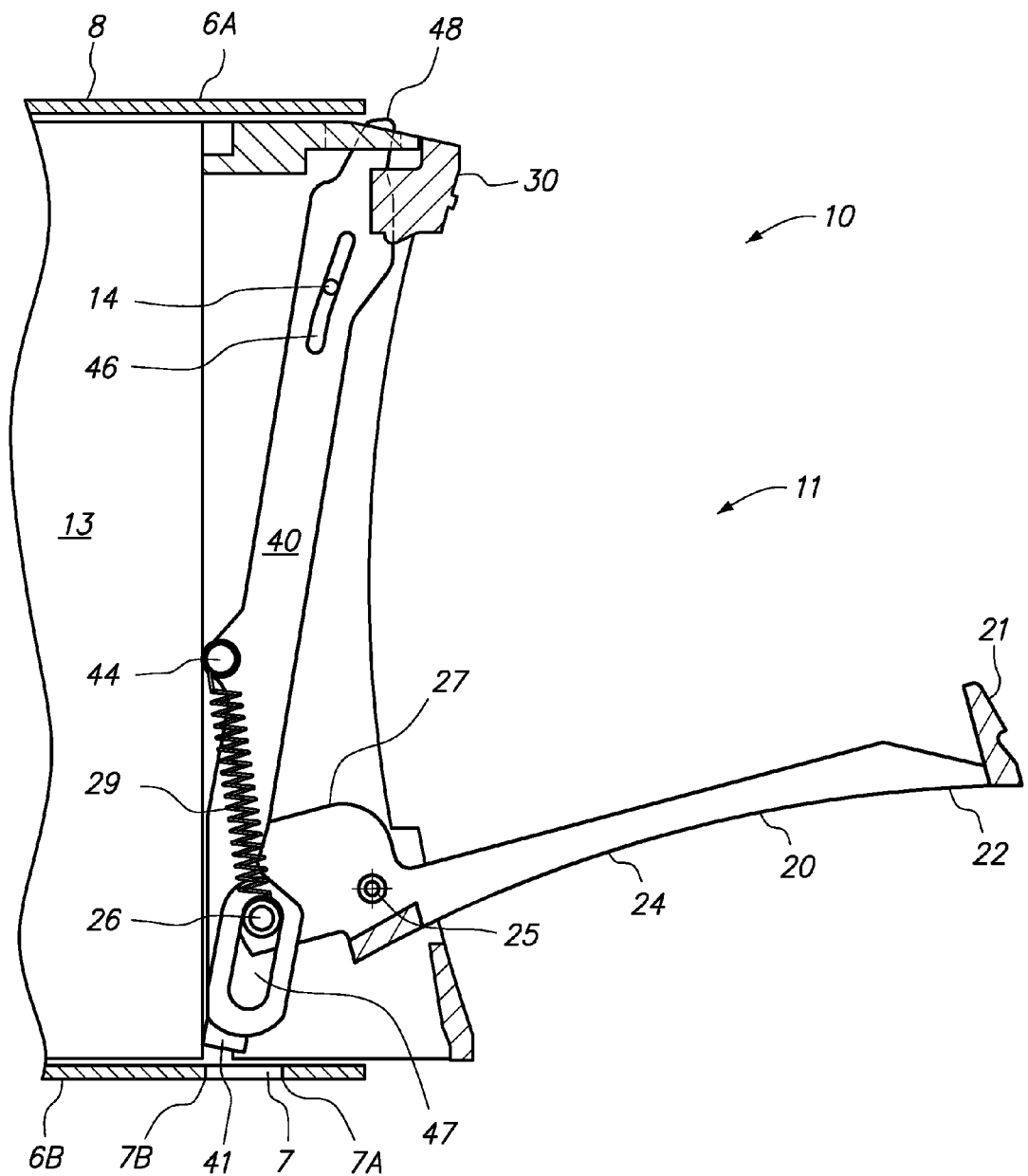
FIG. 5 is the cross-sectional plan view of FIG. 4 after the handle is pivoted further towards the open position to shift the follower and to retract the latch key of the follower from the slot.

FIG. 5 is the cross-sectional plan view of FIG. 4 after the handle 20 is pivoted further towards the open position to substantially shift the follower 40 within the case 12, to retract the latch key 41 of the follower from the slot 7 in the channel 6B of the drive bay 8, and to partially deploy the stop key 48 from the opposing side of the case 12. The translational movement of the follower 40 within the case 12 is evident from the movement of the guide slot 46 relative to the protruding case pin 14 slidably received therein. It should be noted that the partial deployment of the stop key 48 is not obstructed by the channel 6A of the drive bay 8 because the prior interaction of the latch key 41 with the distal end 7B of the slot 7 (compare to FIG. 4) has sufficiently dislodged the hard disk drive carrier 10 from the drive bay 8 to prevent interference.

Figure 6:
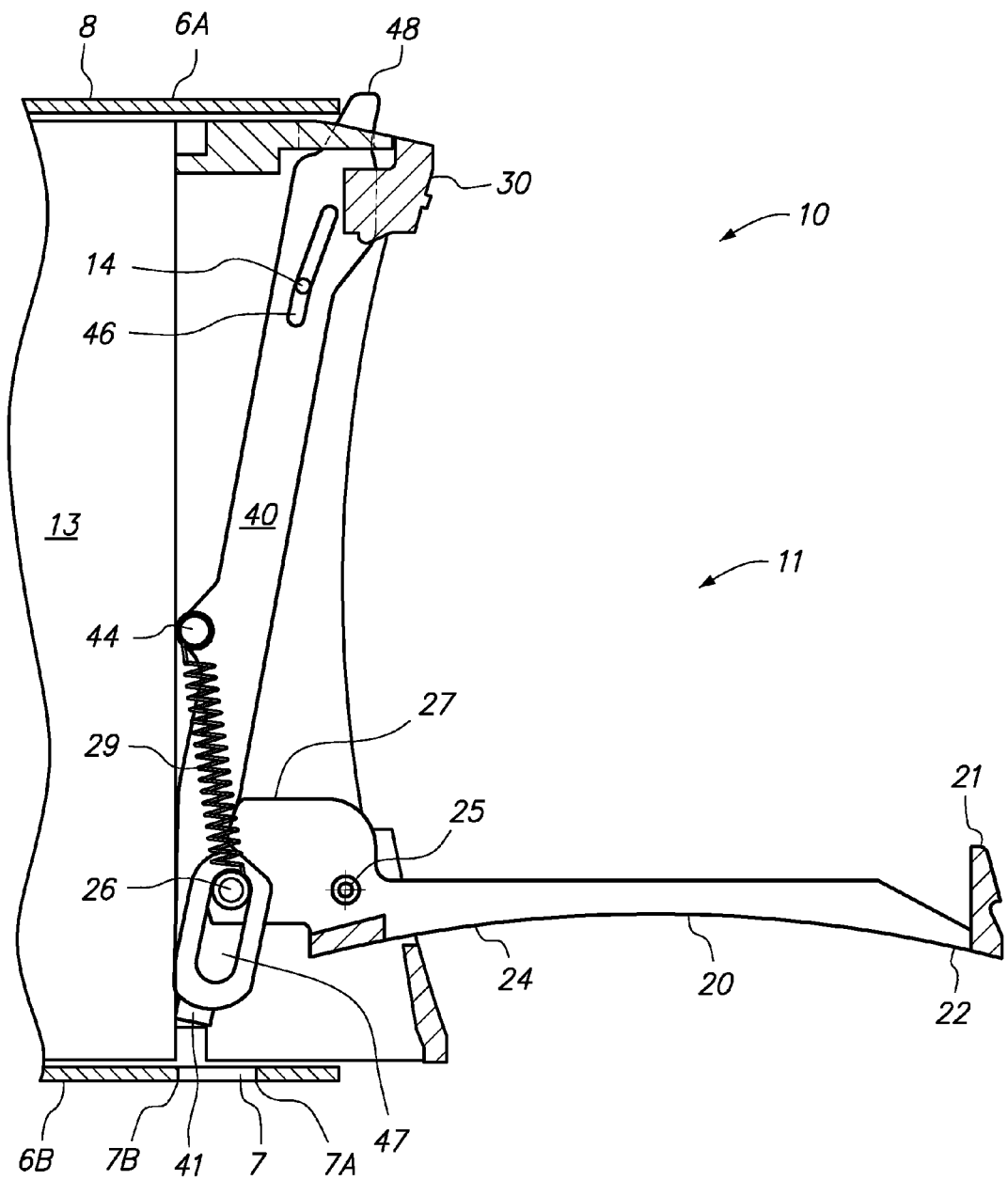
FIG. 6 is the cross-sectional plan view of FIG. 5 after the handle is pivoted further to the open position to further shift the follower and to deploy the stop key at the second end of the follower.

FIG. 6 is the cross-sectional plan view of FIG. 5 after the handle 20 is pivoted further to the open position to further shift the follower 40 within the case 12 and to further deploy the stop key 48 of the follower 40 from the case 12. Preferably, the stop key 48 and the latch key 41 of the follower 40 are both deployed and retracted through apertures in the case 12 (see FIG. 7).

Figure 7:
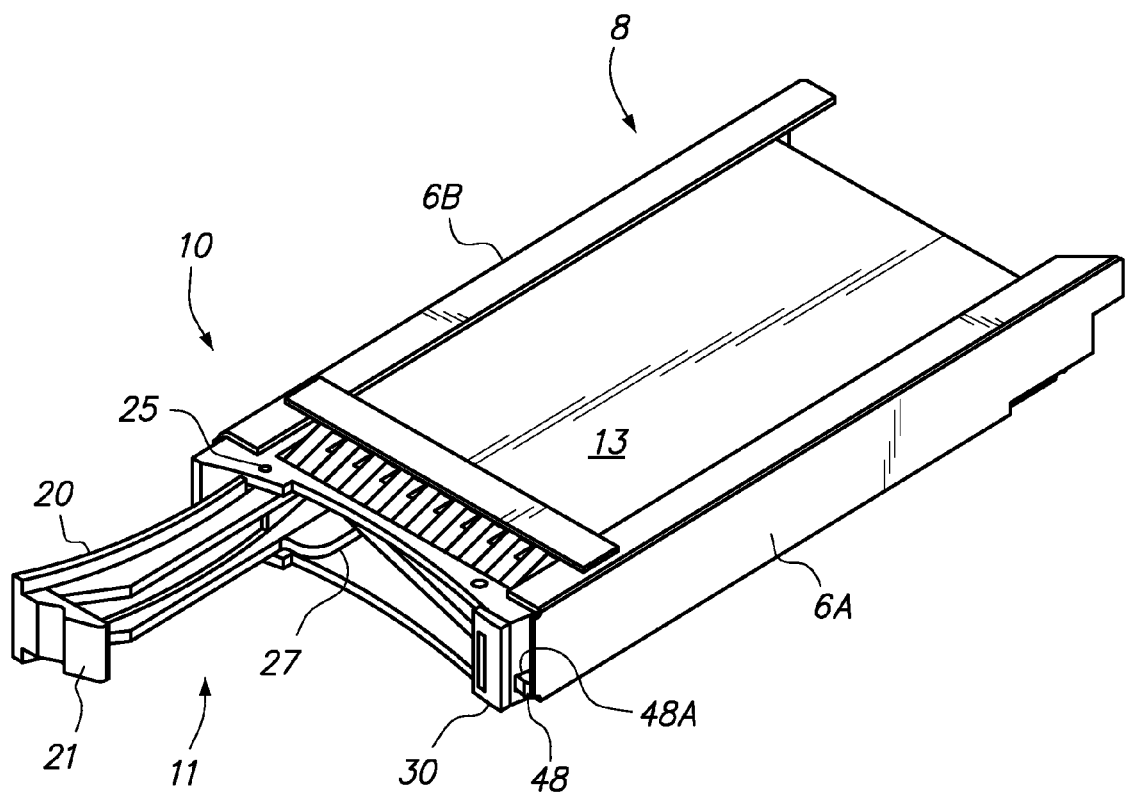
FIG. 7 is a perspective view of a hard disk drive carrier having a latch apparatus of the present invention in its open position and positioned within the HDD cage for being interfaced using the latch apparatus for leveraged insertion.

FIG. 7 is a perspective view of the hard disk drive carrier 10 with the latch apparatus 11 having its handle 20 in an open position. The hard disk drive carrier 10 is partially inserted into the bay 8 and the hard disk drive 13 is aligned for being docked within the drive bay 8 using the latch apparatus for leveraged insertion. The stop key 48 is shown protruding through an aperture 48A in the case 12 to limit the extent to which the hard disk drive carrier 10 may be inserted, and to position the retracted latch key 41 adjacent to the slot 7 in the drive bay 8 (See FIG. 6). The retracted latch key 41 and the slot 7 are not shown in FIG. 7, but the relative positions of these components are generally reflected in FIG. 6 which corresponds to a fully open position of the handle 20. It should be appreciated that pivoting of the handle 20 from the open position shown in FIG. 6 towards the position shown in FIG. 4 will cause the latch key 41 of the follower 40 to first pass through the position of the latch key 41 shown in FIG. 5 where the latch key 41 is adjacent to the slot 7, and then enter the slot 7 as shown in FIG. 4. It should further be understood that further pivoting of the handle 20 from the position shown in FIG. 4 to the position shown in FIG. 2 will cause the latch key 41 to be displaced within the slot 7 towards the proximal end 7A of the slot 7 and then to be forced against the proximal end 7A of the slot 7. It should be understood that an equal and opposite force will be applied, through the latch apparatus, to the hard disk drive carrier 10 to cause the hard disk drive to be fully inserted and docked within the drive bay 8 in a position shown in FIG. 2 to interface with the host computer (not shown).

It should be understood that the movement of the follower 40, and of the latch key 41 of the follower, is determined by the input movement to the first end 22 of the handle 20 and also by the shapes and relative positions of the elements of the couplings between the follower 40 and the handle 20 (such as the follower actuation slot 47 and the handle pin 26), the follower 40 and the case 12 (such as the follower guide slot 46 and the case pin 14), and the case 12 and the handle 20 (such as the handle pivot 25). It should further be understood that the movement of the latch key 41 within the slot 7 produces both the dislodging force on the hard disk drive carrier 10 when the latch key 41 is forced, by pivoting the handle 20 towards the open position, as shown in FIG. 4, against the distal end 7B of the slot 7, and also the insertion force on the hard disk drive carrier 10 when the latch key 41 is forced, by pivoting the handle 20 towards the closed position, against the proximal end 7A of the slot 7. It should be understood that the significant leverage provided by the position of the handle pivot 25 relative to the "input" first end 22 and the output second end 27 (and handle pin 26) of the handle 20 enables the user to impart a substantial dislodging force, when the latch key 41 is urged against the distal end 7B of the slot 7, or a substantial insertion force, when the latch key 41 is urged against the proximal end 7A of the slot 7, to the hard disk drive carrier 10.

It should further be understood that FIGS. 2-6 are used herein to describe and illustrate the sequence of positions of the components of the latch mechanism 11 of the present invention as it is used to dislodge the hard disk drive carrier 10 from a docked position within the drive bay 8, these same figures may be reversed in sequence to generally illustrate the sequence of positions of the components of the latch mechanism 11 of the present invention as it is used to install the hard disk drive carrier 10 to a docked position within the drive bay 8. It should be recognized, however, that during the installation sequence, the latch mechanism 11 does not cause relative movement between the drive bay 8 and the disk drive carrier 10 until after the latch key 41 has come against the proximal end 7A of the slot 7.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A hard disk drive carrier, comprising:
   a case adapted to be secured to a proximal end of a hard disk drive housing;
   a handle pivotally secured to the case intermediate a first end and a second end;
   a lateral follower pivotally secured to the case by a pin and slot coupling and operatively coupled to the handle by a pin and slot coupling, wherein each pin and slot coupling includes a slot slidably receiving a pin; and
   a spring laterally biasing a latch key on the follower towards a slot of a hard disk drive bay;
   wherein pivotal movement of the handle from an open position to a closed position deploys the latch key on the follower beyond a lateral edge of the case and into the slot of the hard disk drive bay and then draws the latch key in a proximal direction, and wherein pivotal movement of the handle from a closed position to an open position moves the latch key in a distal direction and then retracts the latch key from the slot of the hard disk drive housing and within a lateral edge of the case.

2. The hard disk drive carrier of claim 1, wherein the follower is pivotally secured to the case by a pin extending from the case being received within a guide slot formed in the follower.

3. The hard disk drive carrier of claim 2, wherein the guide slot formed in the follower is positioned adjacent an opposite end of the follower from the key.

4. The hard disk drive carrier of claim 1, wherein the follower is operatively coupled to the handle by a pin extending from the handle being received within an actuation slot formed in the follower.

5. The hard disk drive carrier of claim 4, wherein the pin extending from the handle is positioned at a distal end of the handle.

6. The hard disk drive carrier of claim 4, wherein the actuation slot has an axis that is substantially parallel to the lateral follower.

7. The hard disk drive carrier of claim 4, wherein the actuation slot formed in the follower is positioned adjacent the key.

8. The hard disk drive carrier of claim 7, wherein the handle pin is allowed to slide within actuation slot so that the handle may be closed without forcing further lateral displacement of the follower beyond a deployed position.

9. The hard disk drive carrier of claim 4, wherein the spring has a first end coupled to the follower and a second end coupled to the handle pin.

10. The hard disk drive carrier of claim 1, wherein the spring has a first end coupled to the follower and a second end coupled to the case.

11. The hard disk drive carrier of claim 1, wherein the spring has a first end coupled to the follower and a second end coupled to the handle.

12. The hard disk drive carrier of claim 1, wherein the follower includes a stop key at the opposite end of the follower from the latch key.

13. The hard disk drive carrier of claim 12, wherein the deployed position of the stop key corresponds to a retracted position of the latch key, and wherein the retracted position of the stop key corresponds to the deployed position of the latch key.

14. The hard disk drive carrier of claim 1, further comprising a spring-biased locking pawl for securing the handle in the closed position.

15. The hard disk drive carrier of claim 1, further comprising: a pair of rails secured to the case, wherein the pair of rails adapt the case to be secured to the proximal end of the hard disk drive housing.

16. The hard disk drive carrier of claim 15, wherein each rail is securely positionable within a channel of the hard disk drive bay.

* * * * *